D. W. HUTCHINSON.
Four Wheeled Vehicle.
No. 72,737.
Patented Dec. 31, 1867.
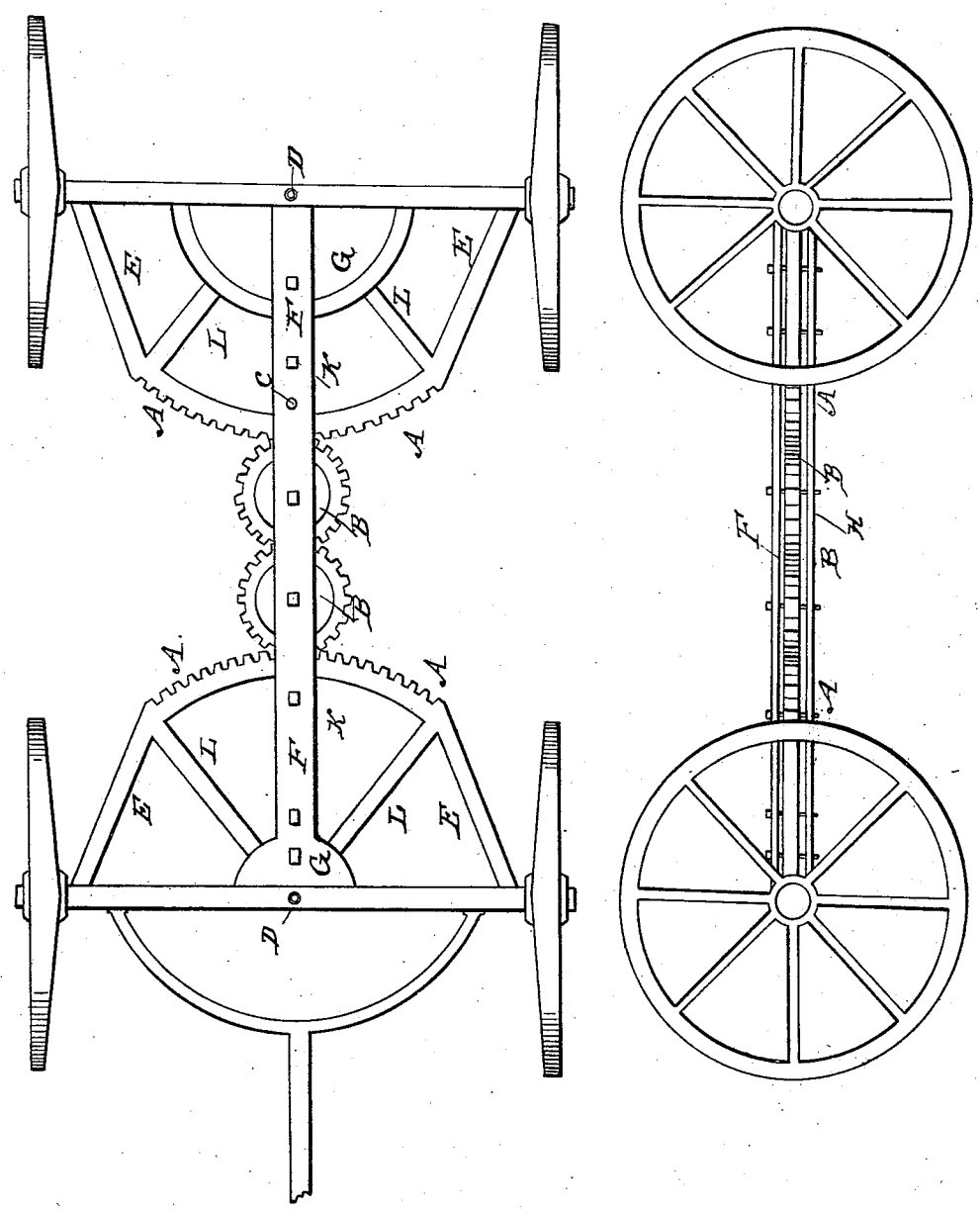

United States Patent Office.

DEAN W. HUTCHINSON, OF BIG SPRING, KANSAS.

Letters Patent No. 72,737, dated December 31, 1867.

IMPROVEMENT IN FOUR-WHEELED VEHICLES.

*The Schedule referred to in these Letters Patent and making part of the same.*

TO WHOM IT MAY CONCERN:

Be it known that I, DEAN W. HUTCHINSON, of Big Spring, Douglas county, Kansas, have invented a new and improved Mode of Constructing Four-Wheeled Vehicles; and I do hereby declare that the following is a full and exact description.

The nature of my invention consists in an arrangement of cog-plates, cog-wheels, fifth-wheels, strap, bolts, and braces, attached to and connected with the front and hind axles and perch of a four-wheeled vehicle, in such a manner as to render the vehicle much safer than the ordinary vehicle, much easier to turn, easier to enter, and of lighter draught.

To enable others skilled in the art to make and use my invention, I will proceed to describe its construction and operation, reference being hereby had to the accompanying drawings, which are made part of this specification. The same letters indicate the same parts in both figures.

Figure 1 is a plan, and

Figure 2 an elevation.

I construct the wheels, axles, perch, and upper portion of the vehicle in any of the ordinary forms, with the exception that the perch, instead of being rigidly attached to the rear axle, is connected to both axles alike, viz, with a king-bolt. But between the two axles, and in the same plane, is an arrangement of gearing, composed as follows, viz:

Two (2) cog-plates, A A A A, attached by means of arms E E E E, one to the forward, and one to the rear axle, which are circular in shape, with their convex sides turned toward each other, and two (2) or more cog-wheels, B B, between the cog-plates, and connecting them. These cog-wheels are between the perch F and a strap, H, which extends underneath the perch, and is connected with the axles by the same bolts that connect the perch, and are supported and kept in place by bolts passing down through the perch F and the strap H. The cog-plates likewise work between the perch and strap. Inside each cog-plate, and in the same plane, is a fifth or D-wheel, G, which is attached to the axle, and also to the cog-plate, by braces L L, which run from the ends of the cog-plate in the direction of the king-bolt D. These braces assist in supporting the cog-plates, and also, by locking against the bolts K K, which pass through both the perch F and strap H, between the fifth-wheel G and the cog-plate A A, keep the axles, in turning the vehicles, from working too far. The king-bolts D D perform the same office in both axles. The bolt that keeps the forward cog-wheel in its place is made so that it can be withdrawn, and the cog-wheel taken out, and then, by putting this bolt, or a similar one, through the hole C, the rear cog-plate becomes fastened to the perch, and the rear axle works in the ordinary manner.

To operate my invention, the forward axle is turned in the desired direction. The forward cog-plate, being attached to it, turns with it. The cog-plate, being in gear with the forward cog-wheel, and that with the rear cog-wheel, and that with the rear cog-plate, and the rear cog-plate being attached to the rear axle, the rear axle is turned just as far as the forward axle, but in the opposite direction. This causes the rear axle to do half the labor of turning, and, in consequence, only half the ordinary space is required. Further, owing to the striking of the brace L against the bolt K, the wheels can never strike against any part of the vehicle, and hence cannot, as is customary, act as a lever to overturn the vehicle. Further, as the axles, in turning, are always thrown in opposite directions, double the room is afforded for entering the vehicle, and, as the rear wheels always track with the forward wheels, a lighter draught is secured.

What I claim as my invention, and desire to secure by Letters Patent, is—

The attachment to four-wheeled vehicles of the cog-plates A A A A, the cog-wheels B B, the fifth-wheels G G, the arms E E E E, the king-bolts D D, the strap H, the lock-bolts K K, the braces L L L L, combined, constructed, and operated as above described.

DEAN W. HUTCHINSON.

Witnesses:
   D. S. McINTOSH,
   R. W. DUMMER.